Aug. 7, 1945.   W. C. HEATH   2,381,284
INDEXING AIRPLANE PROPELLER BLADE
Filed July 31, 1942

William C. Heath
INVENTOR.

BY *Elvin A. Andrus*
ATTORNEY.

Patented Aug. 7, 1945

2,381,284

UNITED STATES PATENT OFFICE 2,381,284

INDEXING AIRPLANE PROPELLER BLADES

William C. Heath, Shorewood, Wis., assignor to A. O. Smith Corporation, Milwaukee, Wis., a corporation of New York Application July 31, 1942, Serial No. 453,095

11 Claims. (Cl. 170—162)

This invention relates to indexing airplane propeller blades as in variable pitch propellers.

Heretofore the feathering or control gear which holds the propeller blade at a given pitch has been threaded into the shank of the blade and held by an indexing pin. When the blade is swung in service, the centrifugal force elastically stretches the shank and loosens the threads, allowing the blade eventually to flutter and gradually cut through the indexing pin, and the blade rotates out of its true indexed position. This is additionally objectionable since where a single blade thus flutters it becomes unbalanced relative to its companion blades on the hub and is apt to set up destructive vibrations.

The object of the present invention is to provide for accurate individual indexing of each blade with its feathering gear under conditions providing for a prestressing of the metal of the threads that assures a retention of tightness of the threads under conditions of service. In this way all of the blades in a propeller can be retained in their proper indexed position and there is no danger of unbalance arising from one blade losing its index and getting out of balance.

Another object is to provide a more accurate indexing of the blade with the feathering gear.

According to the invention in its specific application, the feathering gear is threaded to a predetermined tightness of its shoulder against the shank in which position the metal of the shank is elastically compressed and then unscrewed to the final indexing position for the insertion of a dowel pin, and the correct thickness of washer is applied between the end of the shank and the shoulder of the gear to give the desired same predetermined thread tightness at the position of index.

The accompanying drawing illustrates the method and structure of the invention.

Figure 1:
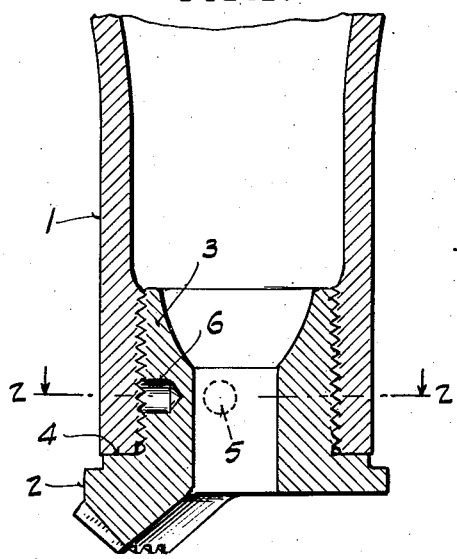
Figure 1 is a longitudinal central section through the shank of a propeller blade and feathering gear illustrating the first threading of the two together.
Figure 2:
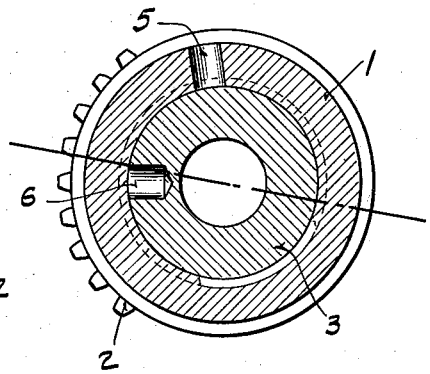
Fig. 2 is a transverse section taken on line 2—2 of Fig. 1.

The shank 1 of the propeller blade is internally threaded and machined on its end at right angles to the axis of the thread.

The feathering gear 2 has an externally threaded projection 3 and shoulder 4 adjacent thereto. The shoulder 4 is similarly machined at right angles to the axis of the threads on member 3 so that when the member 3 is threaded into the shank 1 as illustrated in Fig. 1, the shoulder 4 will uniformly engage the end of the shank 1 around the circumference.

As illustrated in Fig. 1, the projection 3 is threaded into shank 1 preferably by a lever arm and hydraulic connection to obtain a predetermined measured torque under which the metal of the threads is given a stress sufficient to prevent loosening from the centrifugal action of the blade in full swing.

The shank 1 has a dowel hole 5 bored transversely therethrough at a position giving the proper index for pitch of the propeller blade. Likewise, the projection 3 has a similar dowel hole 6 bored transversely therein for indexing with hole 5. When these holes are in alignment the gears of the feathering gear are accurately positioned with respect to the pitch of the propeller blade.

Figure 3:
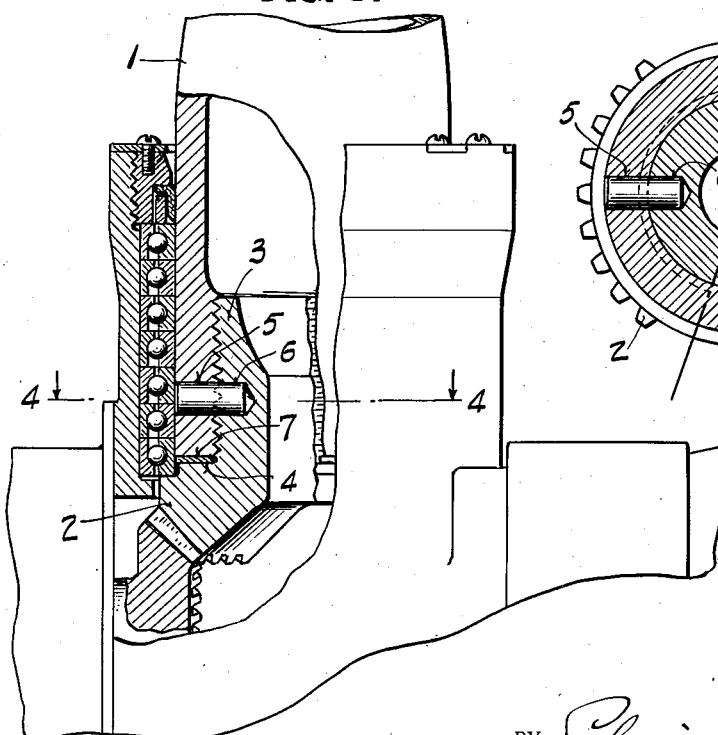
Fig. 3 is a side elevation partly sectioned to show the final threading of the propeller blade and feathering gear together.
Figure 4:
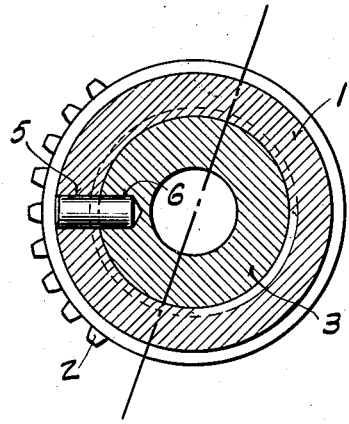
Figure 4 is a transverse section similar to Fig. 2, but taken on line 4—4 of Fig. 3.

Should the holes 5 and 6 be in alignment when the projection 3 is threaded home in shank 1, a dowel pin may be inserted in the holes and the assembly is complete. However, should the holes be out of alignment at this stage of the assembling operation, as illustrated in Fig. 1, the projection 3 is unscrewed and a washer 7 of predetermined thickness is selected to be inserted between shoulder 4 and the end of shank 1 as illustrated in Fig. 3. The thickness of the washer should be such as to insure that when the projection 3 is threaded into shank 1 to the point of registry of the holes 5 and 6 the desired same predetermined torque will have been applied to the parts to stress the same as they were in the step illustrated in Fig. 1.

In practice, known washers of different thickness will be furnished, and in assembling each propeller blade and its respective feathering gear, the washer known to compensate for the axial movement resulting from a given angular movement of the thread to obtain registry of the indexing holes is selected and employed. In practice, a standard thickness washer may be employed in the first threading of the parts, as in Fig. 1, and this may then be replaced by the required thicker washer to provide for matching of the dowel holes with the threads under the desired prestress. This enables the employment of thicker washers which are less apt to become bent or injured in handling.

The prestressing of the threads by applying an added known tightness thereto results in an elastic stretching of the projection 3 balanced by an elastic compression of the shank 1. When the blade is swung, the centrifugal forces developed must first overcome the initial compression of the shank before any separation of the threads or loosening of the same occurs. Where the prestress or initial compression in the shank exceeds the tension stress resulting from centrifugal action, the tightness of the threads will be retained and there will be no danger of fluttering of the blade.

The blades and feathering gears are interchangeable in the field. Each assembly is an operation by itself and involves simply the applying of the required initial torque and the selection of the washer of correct thickness for the purpose.

Various embodiments of the invention may be employed within the scope of the accompanying claims.

I claim:

1. In the assembly of a propeller blade with its feathering gear in which the shank of the propeller and the gear are threaded together and have abutting shoulders, the employment of a washer between the shoulders and having a selected thickness to effect a predetermined stressing of the threads at the indexing position to prevent loosening of the threads when the blade is swung under load.

2. In combination, a propeller blade having an internally threaded shank and a transverse indexing hole therein accurately positioned relative to the pitch of the blade, a feathering gear having a member threaded into the shank of said blade with a transverse indexing hole therein, a washer of predetermined thickness disposed between the shank and feathering gear and selected from a plurality of washers of different thicknesses to provide a given tightening of the threads and prestressing of the metal of the shank and member under predetermined torque when the indexing holes register with one another, and a pin in said registering holes to hold the parts from unthreading.

3. In combination, a propeller blade having an internally threaded shank and a transverse indexing hole therein accurately positioned relative to the pitch of the blade, a feathering gear having a member threaded into the shank of said blade with a transverse indexing hole therein, said shank and feathering gear having opposed surfaces accurately machined relative to the axis of the threads of the respective members, a washer of predetermined thickness disposed between said accurately machined opposed surfaces of the shank and feathering gear and selected from a plurality of washers of different thicknesses to provide a given tightening of the threads and prestressing of the metal of the shank and member under predetermined torque when the indexing holes register with one another, and a pin in said registering holes to hold the parts from unthreading.

4. In the art of indexing a propeller blade with its feathering gear where the blade and gear are threaded together and have abutting shoulders limiting the threading thereof, the steps comprising first tightening the threaded connection of the members against the abutting shoulders under a predetermined torque load to prestress the members a given amount, then unthreading the members and inserting therebetween a washer of a predetermined thickness which upon rethreading the connection will effect substantially the same tightness of the threads at an indexed position of the members as existed in the first tightening step, and rethreading the connection to the indexing position with the parts prestressed to substantially the same amount as previously determined.

5. In the art of indexing a propeller blade with its feathering gear where the blade and gear are threaded together and have abutting shoulders limiting the threading thereof, the steps comprising first tightening the threaded connection of the members against the abutting shoulders under a predetermined torque, then unthreading the members and inserting between said shoulders a washer of a predetermined thickness, rethreading the connection to effect substantially the same tightness of the threads at an indexed position of the members as existed in the first tightening step, and indexing the members at said position to prevent unthreading thereof, the tightness of said threads providing a residual prestress in the members sufficient to substantially prevent loosening of the blade in operation.

6. In the art of indexing a propeller blade with its feathering gear where the blade and gear are threaded together and have abutting shoulders limiting the threading thereof, the steps comprising first threading the parts together against the opposing shoulders under a predetermined prestressing torque, noting the amount of return threading necessary to bring the parts back to an indexing position, then unthreading the parts and inserting between said shoulders a washer having a thickness compensating for the noted amount of return threading, rethreading the parts together to the indexing position to effect the same prestressed condition of the metal thereof as resulted from the application of said predetermined torque in the first instance, and indexing the members at said position to prevent unthreading thereof.

7. In the assembly of propeller blades with their respective feathering gears in which the shanks of the blades and the gears are threaded together and have abutting shoulders, the prestressing of the threads to substantially the same predetermined tightness at the indexing position for each blade to counteract loosening of the threads in service and maintain the balance of propellers.

8. In combination, a propeller blade having an internally threaded shank and a transverse indexing hole therein accurately positioned relative to the pitch of the blade, a feathering gear having a member threaded into the shank of said blade with a transverse indexing hole therein, said shank and feathering gear having abutments for limiting the inter-threading thereof, and the distance between said abutments being selected to provide a sufficient pre-stressing of the metal of the shank and gear adjacent the threads when the indexing holes are in registry to prevent loosening of the threads in service, a washer for maintaining said selected distance between the abutments, and a pin disposed in said registering holes.

9. In the art of indexing a propeller blade with its feathering gear, the steps comprising first measuring the space required between fixed abutments of said blade and gear that will effect a predetermined selected pre-stressing of the metal adjacent the threads thereof at the indexed position to prevent loosening of the threads in service, and thereafter inserting a washer of selected thickness to fill said space between the abutments, and assembling said blade and feathering gear to said indexing position.

10. In the art of indexing a propeller blade with its feathering gear, the steps comprising first tightening the threaded connection of the blade and gear members against abutting shoulders under a predetermined torque, unthreading the members to indexing position and thereby determining the spacing of the abutments required for a given pre-stressing of the members at said indexing position, and then disassembling the members and inserting a washer between said shoulders of the selected thickness for spacing said shoulders the right amount to provide said predetermined pre-stressing of the metal of the members, rethreading said members together and indexing the same under the given pre-stress to prevent loosening of the threads in service.

11. In the art of indexing a propeller blade with its feathering gear, the steps comprising first tightening the threaded connection of the blade and gear members under a predetermined torque with a washer of standard thickness between the abutting shoulders of the members, determining from the relative position of the index marks of said members the space required between said abutments to provide a given pre-stressing of the metal of the blade and gear adjacent the threads when the members are indexed, disassembling the members and substituting for said washer a washer of selected thickness to provide said required spacing of said abutments, assembling said members with said latter washer therebetween and threading the same to indexing position, and indexing said members at said position.

WILLIAM C. HEATH.